United States Patent [19]

Hattori

[11] Patent Number: 5,140,668
[45] Date of Patent: Aug. 18, 1992

[54] PHONEME RECOGNITION UTILIZING RELATIVE POSITIONS OF REFERENCE PHONEME PATTERNS AND INPUT VECTORS IN A FEATURE SPACE

[75] Inventor: Hiroaki Hattori, Tokyo, Japan
[73] Assignee: NEC Corporation, Tokyo, Japan
[21] Appl. No.: 600,049
[22] Filed: Oct. 19, 1990

Related U.S. Application Data

[63] Continuation-in-part of Ser. No. 269,347, Nov. 10, 1988, abandoned.

[30] Foreign Application Priority Data

Nov. 10, 1987 [JP] Japan .................................. 62-284924

[51] Int. Cl.⁵ .............................................. G10L 5/04
[52] U.S. Cl. ............................................ 395/2; 381/41
[58] Field of Search ................ 364/513.5; 381/41-50; 395/2

[56] References Cited

U.S. PATENT DOCUMENTS

| | | | |
|---|---|---|---|
| 4,601,054 | 7/1986 | Watari et al. | 381/43 |
| 4,618,983 | 10/1986 | Nishioka et al. | 381/43 |
| 4,712,243 | 12/1987 | Ninomiya et al. | 381/43 |
| 4,715,004 | 12/1987 | Kabasawa et al. | 364/513.5 |
| 4,718,094 | 1/1988 | Bahl et al. | 381/43 |
| 4,860,358 | 8/1989 | Rabiner | 381/43 |
| 4,903,306 | 2/1990 | Nakamura | 381/42 |

Primary Examiner—Dale M. Shaw
Assistant Examiner—David D. Knepper
Attorney, Agent, or Firm—Sughrue, Mion, Zinn, Macpeak & Seas

[57] ABSTRACT

In a phoneme recognition apparatus, first distances between input vectors and reference vectors are determined. If the first distances are lower than a threshold value, the input vectors are identified as corresponding to the reference vectors. If the first distances are higher than the threshold value, the input vectors are identified as being indeterminate, and input differential vectors between the input vectors identified as corresponding to a reference vector and those identified as not corresponding to any of the reference vectors are determined. In addition, reference differential vectors between the reference vectors having corresponding input vectors and are those having no corresponding input vectors are determined. Second distances between the input differential vectors and the reference differential vectors are calculated and summed. The indeterminate input vectors are then identified as corresponding to the reference vectors in accordance with combined values of the first distances and the summed second distances.

5 Claims, 2 Drawing Sheets

PHONEME RECOGNITION UTILIZING RELATIVE POSITIONS OF REFERENCE PHONEME PATTERNS AND INPUT VECTORS IN A FEATURE SPACE

RELATED APPLICATION

This application is a continuation-in-part application of U.S. patent application Ser. No. 07/269,347, filed Nov. 10, 1988, now abandoned.

BACKGROUND OF THE INVENTION

The present invention relates to a phoneme recognition apparatus for analyzing utterances of unspecified individuals.

As shown in FIG. 1, a known phoneme recognition apparatus generally comprises a distance calculator 10 which reads reference phoneme patterns from a memory 12 in response to an input feature vector and calculates a Euclidean distance between them. A decision circuit 11 determines the least Euclidean distance and recognizes it as a right phoneme. For example, in a feature space of FIG. 2, reference patterns of phonemes A, B and C are located in areas defined by decision functions 13. Distance calculator 10 determines the Euclidian distances between each of input feature vectors 14 and 15 and reference phonemes A, B and C and recognizes vectors 14 and 15 as phonemes A and B, respectively. However, difficulty arises in the determination whether the feature vector 15 corresponds to reference phoneme B or C if it falls midway between them.

SUMMARY OF THE INVENTION

It is therefore an object of the present invention to provide a phoneme recognition apparatus capable of precision recognition of phonemes.

This object is obtained by utilizing the relative positions of reference phoneme patterns and those of input feature vectors in a feature space.

According to a first aspect of the present invention, there is provided a phoneme recognition apparatus which comprises an input pattern memory for storing input vectors, a reference pattern memory for storing reference vectors respectively representing phonemes, and a first distance calculator for determining first distances between the input vectors and the reference vectors and storing the first distances into a first distance memory. A first discriminator is provided for determining whether the first distances are lower or higher than a prescribed threshold value and identifying those of the input vectors which correspond to those of the first distances determined as being lower than the threshold value as corresponding to the reference vectors and identifying those of the input vectors which correspond to those of the first distances determined as being higher than the threshold value as being indeterminate. Input differential vectors between the input vectors which are identified as corresponding to the reference vectors and those identified as not corresponding to any of the reference vectors are determined and in addition, reference differential vectors between the reference vectors having corresponding input vectors and those having no corresponding input vectors are determined. Both of the differential vectors are fed to a second distance calculator in which second distances between the input differential vectors and the reference differential vectors are determined. The second distances are summed in an adder and fed to a second discriminator to which the first distances are also supplied from the first distance memory. In accordance with combined values of the first distances and the summed second distances, the second discriminator identifies the indeterminate input vectors as corresponding to the reference vectors.

Preferably, the first discriminator identifies one of the reference vectors which corresponds to a minimum of the first distances, determines whether the minimum of the first distances is lower or higher than the threshold value and identifies one of the input vectors which corresponds to the minimum of the first distances as corresponding to the identified reference vector if the minimum of the first distances is determined as being lower than the threshold value, and identifies one of the input vectors which corresponds to the minimum of the first distances as being indeterminate if the minimum of the first distances is determined as being higher than the threshold value. The second discriminator identifies one of the reference vectors which corresponds to a minimum of the combined values of the first distances and the summed second distances and identifies one of the indeterminate input vectors which corresponds to the minimum of the combined values as corresponding to the reference vector identified as corresponding to the minimum combined value.

BRIEF DESCRIPTION OF THE DRAWINGS

The present invention will be described in further detail with reference to the accompanying drawings, in which.

DETAILED DESCRIPTION

Figure 1:
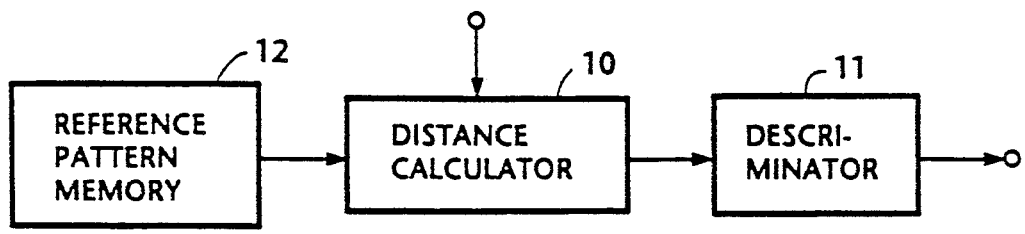
FIG. 1 is a block diagram of a prior art phoneme recognition apparatus.
Figure 2:
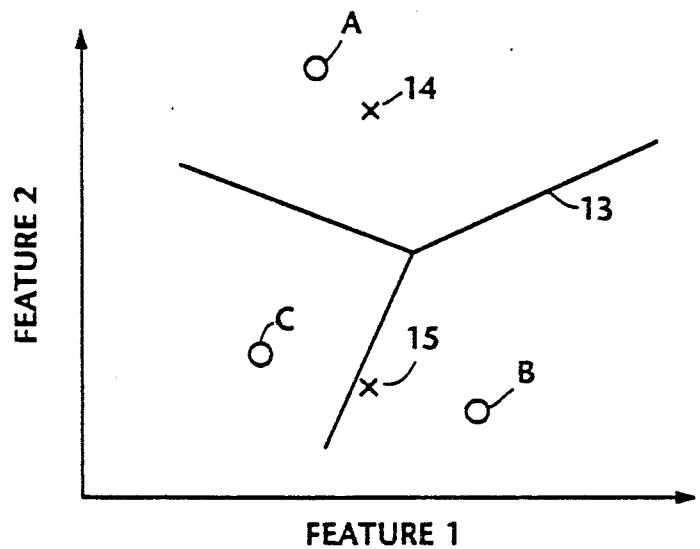
FIG. 2 is a graphic representation of reference phoneme vectors, or patterns, and input feature vectors in a feature space used in the determination of phonemes according to the prior art recognition apparatus.
Figure 3:
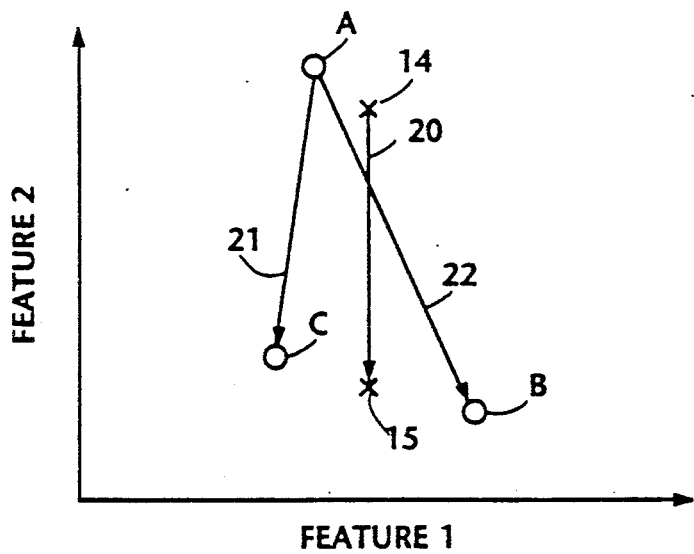
FIG. 3 is a graphic representation of reference phoneme patterns and input feature vectors in a feature space useful for describing the operating principle of the present invention.

Referring again to FIG. 2, it is seen that reference phoneme B has a greater value of feature 1 than reference phoneme A but smaller value of feature 2 than phoneme A, and input feature vector 15 has an approximately equal value of feature 1 to input vector 14 but smaller value of feature 2 than vector 14. Thus, with the input vector 14 being recognized as phoneme A, it can be determined with a high degree of similarity from the relative position of vector 15 in the feature space that it corresponds to phoneme C. This implies that, in a feature space in which the absolute positions of reference phonemes may vary from person to person but their relative positions are invariant, phoneme recognition can be precisely made of an input feature vector from its relative position to other input feature vectors if one of such vectors can be recognized as a reference phoneme. The f1-f2 formant plane, which is defined by coordinates of first and second formant frequencies, can also be used for such a feature space. In FIG. 3, a differential vector 21 is drawn from reference phoneme A to phoneme C and a differential vector 22 is drawn from phoneme A to phoneme B, and a differential vector 20 is drawn from input vector 14 to input vector 15. As will be described hereinbelow, the phoneme recognition algorithm of the present invention involves the calculation of distances from the differential vector 20 to the differential vectors 21 and 22 and the determination that input vector 15 gives the least distance indicating that it corresponds to phoneme C.

Figure 4:
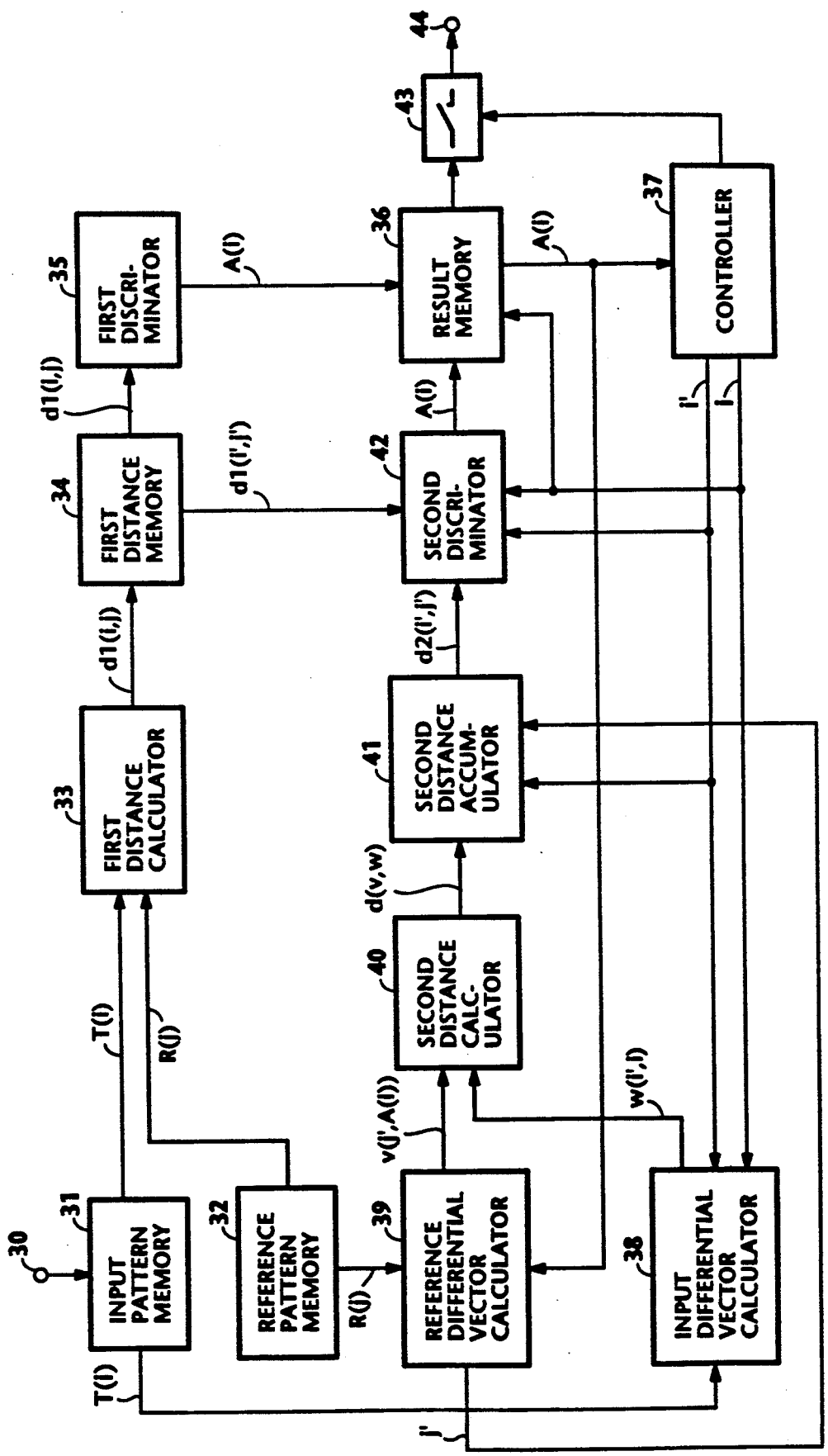
FIG. 4 is a block diagram of a phoneme recognition apparatus of the present invention.

Referring now to FIG. 4, a block diagram of a phoneme recognition apparatus of the present invention is illustrated. The apparatus comprises an input pattern memory 31 to which a sequence of input feature vectors T(i) (where i=1, 2, ... N) are supplied from an input terminal 30 and stored therein. Reference phoneme vectors R(j) (where j=1, 2, ... M) are stored in a reference pattern memory 32. The reference phoneme vectors can be obtained by averaging the formant frequencies of each utterance of many individuals or by a covariance matrix which serves to absorb variabilities between individuals. A first distance calculator 33 is coupled to the memories 31 and 32 to receive feature vectors T(i) and reference vectors R(j) at frame intervals and calculates first distances d1(i, j) (where i=1~N, and j=1~M) between all vectors of the input and reference vector sequences according to the following formula:

$$d1(i,j) = |T(i) - \mu(j)| \quad (1)$$

where $\mu(j)$ is an average vector of phonemes j. Alternatively, the following Mahalanobis distance can also be used:

$$d1(i,j) = \{T(i) - \mu(j)\}' \Sigma(j)^{-1} \{T(i) - \mu(j)\} \quad (2)$$

where $\Sigma(j)$ is a covariance matrix of phonemes j.

The output d1(i,j) of the first distance calculator 33 is stored into a first distance memory 34 to which a first discriminator 35 is connected. First discriminator 35 searches all variables i to identify $j_{min}(i)$ which corresponds to a minimum of the first distances d1(i,j) and proceeds to compare the minimum distance d1(i,$j_{min}(i)$) with a prescribed threshold value. If the minimum distance is smaller than the threshold value, first discriminator 35 identifies the input vector T(i) as corresponding to the phoneme $j_{min}(i)$ and establishes the following relationship:

$$A(i) = j_{min}(i)$$

If the minimum distance is greater than the threshold value, first discriminator 35 identifies the input vector as being indeterminate and establishes the following relationship:

$$A(i) = \text{indeterminate}$$

Let l represent a population of variables i each of which is identified by discriminator 35 as corresponding to a phoneme and let l' represent a population of variables i' which are identified as being indeterminate. The results of the discrimination by discriminator 35 are stored into a result memory 36. A controller 37 is connected to the result memory 36 to search its contents for input vectors that belong to population l'. If population l' is not found in the result memory, controller 37 causes stored results A(i) (where i=1~N) to be read out of memory 36 and forwarded through switch 43 to an output terminal 44. If population l' is found in the memory 36, controller 37 proceeds to identify vectors T(i') (where i'εl') in a manner as described hereinbelow until all such vectors are identified as corresponding to phonemes.

An input differential vector calculator 38 is connected to controller 37 to receive from it variables i and i'. On receiving these variables, the input differential vector calculator 38 reads vectors T(i) and T(i') from input pattern memory 31, where T(i) corresponds to an input vector identified by discriminator 35 as corresponding to a phoneme and vector T(i') corresponds to one identified by discriminator 35 as not corresponding to a phoneme. Differential vector calculator 38 calculates input differential vectors w(i',i) given by:

$$w(i',i) = T(i') - T(i) \quad (3)$$

Therefore, the input differential vector w(i',i) represents the position of an input vector i' which was identified as not corresponding to a phoneme relative to an input vector i which was identified as corresponding to that phoneme.

A reference differential vector calculator 39 is connected to reference pattern memory 32 and to result memory 36. Controller 37 addresses the result memory 36 using variables i to read out A(i) from memory 36 into calculator 39. Calculator 39 reads reference vectors R(j) (where j=1~M) and calculates reference differential vectors v(j', A(i)) given by:

$$v(j', A(i)) = R(j') - R(A(i)) \quad (4)$$

where j'=1~M, j'≠A(i). Since A(i) represents the identification number of a reference vector identified by discriminator 35 as corresponding to a phoneme and j' represents any other reference vector identified by discriminator 35 as not corresponding to a phoneme, the differential vector v(j', A(i)) represents the position of the reference vector R(j') relative to a reference vector R(A(i)) which is closest to the vector R(j').

A second distance calculator 40 is provided, which receives the reference differential vectors v(j', A(i)) and the input differential vectors w(i', i) from differential calculators 39 and 38, respectively, and calculates second distances d(v(j', A(i)), w(i', i)) between input vectors T(i') and reference vectors R(j') relative to the distances between input vectors T(i) and reference vector R(A(j)).

A second distance accumulator 41 is provided to receive vectors i' from controller 37, vectors j' from calculator 39 and distances d(v(j', A(i)), w(i', i)) from second distance calculator 40 and provides summations for all variables i (iεl) to determine summed second distances between input vectors T(i') and reference vectors R(j') to give summed second distances d2(i', j'):

$$d2(i',j) = \sum_{i \in I} d(v(j', A(i)), w(i',i)) \quad (5)$$

A second discriminator 42 is provided to receive the first distances d1(i', j') from first distance memory 34 and the second distances d2(i', j') from the accumulator 41 when all processes for all variables i (iεl) have been completed with respect to a given vector i' and calculates distances d(i', j') given by:

$$d(i',j) = \alpha d1(i',j) + \beta d2(i',j) \quad (6)$$

where $\alpha$ and $\beta$ are weighting coefficients, and where $j'=1\sim M$. Discriminator 42 proceeds to identify $j_{min}(i')$ which corresponds to a minimum of combined distances $d(i', j')$ and identifies input vectors $T(i')$ as corresponding to phonemes $j_{min}(i')$ and stores the results of the discrimination $A(i')=j_{min}(i')$ into the result memory 36. When this occurs, controller 37 causes stored results of the discrimination to be read out of memory 36 and forwarded through switch 43 to output terminal 44.

What is claimed is:

1. A phoneme recognition apparatus comprising:
   an input pattern memory for storing input vectors;
   a reference pattern memory for storing reference vectors respectively representing phonemes;
   first distance calculator means for determining first distances between said input vectors and said reference vectors;
   a first distance memory for storing the first distances;
   first discriminator means for determining whether the first distances are lower or higher than a prescribed threshold value and identifying a first portion of said input vectors which corresponds to those of the first distances which are determined as being lower than said threshold value as corresponding to said reference vectors and representing said first portion of said input vectors by first phoneme symbols, and identifying a second portion of said input vectors which corresponds to those of the first distances which are determined as being higher than said threshold value as being indeterminate and representing said second portion of said input vectors by second phoneme symbols;
   a result memory for storing said first and second phoneme symbols;
   input differential vector calculator means for determining input differential vectors between the input vectors identified by said first discriminator means as corresponding to said reference vectors and the input vectors identified by said first discriminator means as not corresponding to said reference vectors;
   reference differential vector calculator means for determining reference differential vectors between the reference vectors having corresponding input vectors and the reference vectors having no corresponding input vectors;
   second distance calculator means for determining second distances between said input differential vectors and said reference differential vectors;
   adder means for providing summations of said second distances; and
   second discriminator means responsive to a command signal applied thereto for identifying said second portion of said input vectors as corresponding to said reference vectors in accordance with combined values of the first distances stored in said first distance memory and said summed second distances and representing said second portion of said input vectors by third phoneme symbols.

2. A phoneme recognition apparatus as claimed in claim 1, further comprising:
   control means for applying said command signal to said second discriminator means if said second phoneme symbols are stored in said result memory, and causing the first and third phoneme symbols to be read out of said result memory into an external circuit.

3. A phoneme recognition apparatus as claimed in claim 1, wherein said first discriminator means identifies one of said reference vectors which corresponds to a minimum of said first distances, determines whether said minimum of said first distances is lower or higher than said prescribed threshold value and identifies one of said input vectors which corresponds to the minimum of said first distances as corresponding to said identified reference vector if said minimum of said first distances is determined as being lower than said threshold value, and identifies one of said input vectors which corresponds to said minimum of said first distances as being indeterminate if said minimum of said first distances is determined as being higher than said threshold value, and wherein said second discriminator means identifies one of said reference vectors which corresponds to a minimum of said combined values and identifies one of said indeterminate input vectors which corresponds to said minimum combined value as corresponding to said reference vector identified as corresponding to said minimum combined value.

4. A method for identifying input vectors using reference vectors representing phonemes, comprising the steps of:
   a) determining first distances between said input vectors and said references vectors;
   b) determining whether the first distances are lower or higher than a prescribed threshold value and identifying a first portion of said input vectors which corresponds to those of the first distances determined as being lower than said threshold value as corresponding to said reference vectors, storing said first portion of said input vectors as first phoneme symbols into a result memory, identifying a second portion of said input vectors which corresponds to those of the first distances determined as being higher than said threshold value as being indeterminate, and storing said second portion of said input vectors as second phoneme symbols into said result memory;
   c) determining input differential vectors between the input vectors identified by the step (b) as corresponding to said reference vectors and the input vectors identified by the step (b) as not corresponding to said reference vectors;
   d) determining reference differential vectors between the reference vectors having corresponding input vectors and the reference vectors having no corresponding input vectors;
   e) determining second distances between said input differential vectors and said reference differential vectors;
   f) providing summations of said second distances; and
   g) identifying said second portion of said input vectors as corresponding to said reference vectors in accordance with combined values of the first distances determined by the step (a) and the second distances summed by the step (f); and storing the identified second portion of said input vectors into said result memory as third phoneme symbols.

5. A method as claimed in claim 4, wherein the step (b) comprises:
   (b1) identifying one of said reference vectors as corresponding to a minimum of said first distances;
   (b2) determining whether said minimum of said first distances is lower or higher than said prescribed threshold value;

(b3) if said minimum of said first distances is determined as being lower than said threshold value, identifying one of said input vectors which corresponds to the minimum of said first distances as corresponding to said reference vector identified by the step (b1); and (b4) if said minimum of said first distances is determined as being higher than said threshold value, identifying one of said input vectors which corresponds to said minimum of said first distances as being indeterminate, and wherein the step (g) comprises:

(g1) identifying one of said reference vectors as corresponding to a minimum of said combined values; and (g2) identifying one of said input vectors which corresponds to said minimum combined value as corresponding to the reference vector identified by the step (g1).

* * * * *